G. W. LA VOO.

PIPE AND SOCKET HOLDER.

APPLICATION FILED APR. 12, 1910.

992,887. Patented May 23, 1911.

2 SHEETS—SHEET 1.

WITNESSES

Elva Stanick

INVENTOR

G. W. La Voo by F. N. Barber his attorney

G. W. LA VOO.
PIPE AND SOCKET HOLDER.
APPLICATION FILED APR. 12, 1910.

992,887. Patented May 23, 1911.

2 SHEETS—SHEET 2.

WITNESSES

J. P. Heffleman,
Elva Stanick

INVENTOR

G. W. La Voo
by F. N. Barber
his attorney

UNITED STATES PATENT OFFICE.

GEORGE W. LA VOO, OF STEUBENVILLE, OHIO.

PIPE AND SOCKET HOLDER.

992,887. Specification of Letters Patent. Patented May 23, 1911.

Application filed April 12, 1910. Serial No. 555,031.

*To all whom it may concern:*

Be it known that I, GEORGE W. LA VOO, a citizen of the United States, residing at Steubenville, in the county of Jefferson and State of Ohio, have invented or discovered new and useful Improvements in Pipe and Socket Holders, of which the following is a specification.

My invention relates to means for holding tubular articles, such as pipes, and pipe couplings or sockets, and for screwing couplings or sockets on pipes.

The object of my invention is to provide a pipe or coupling holding device or chuck that is self-gripping and that grips tighter as the resistance increases.

Figure 1:
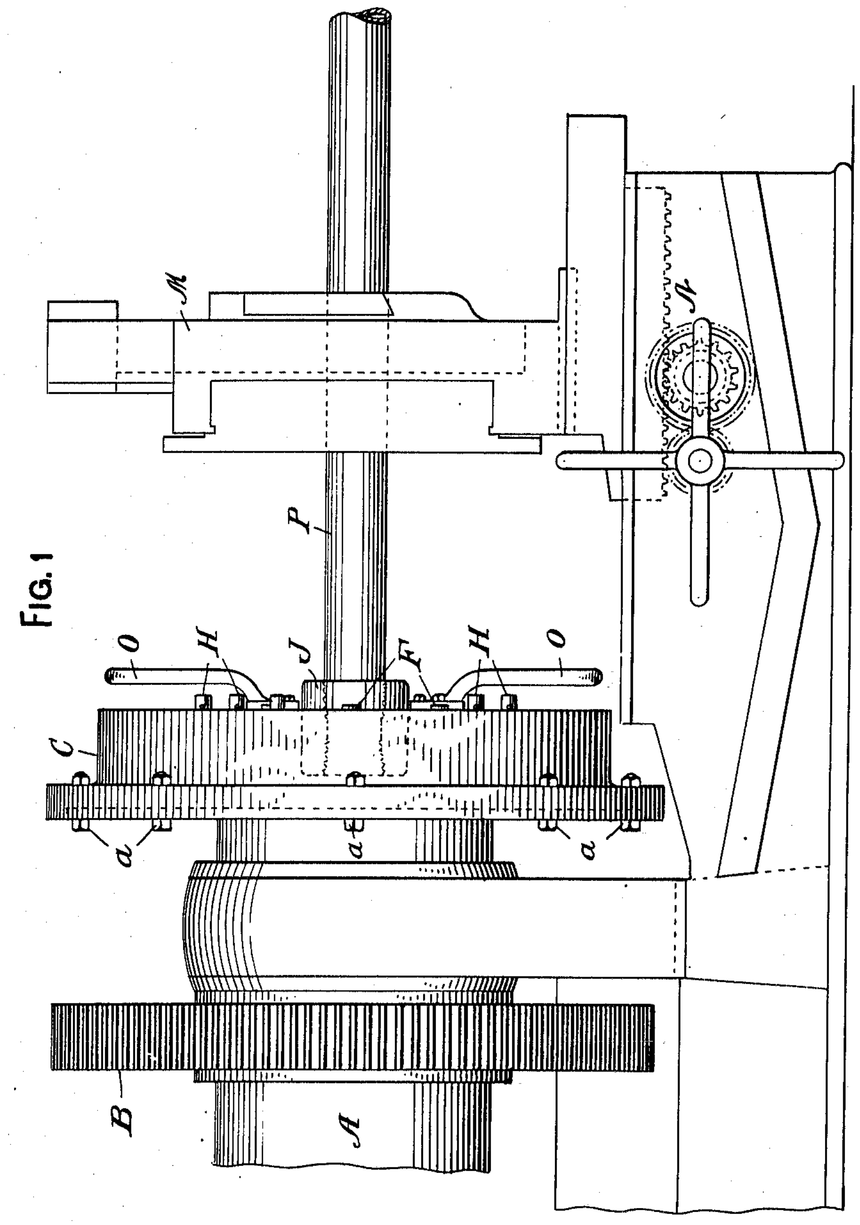
Figure 4:
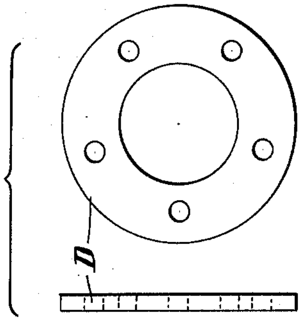
Figure 5:
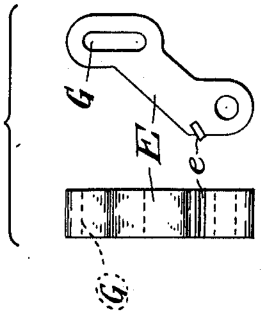
Figure 3:
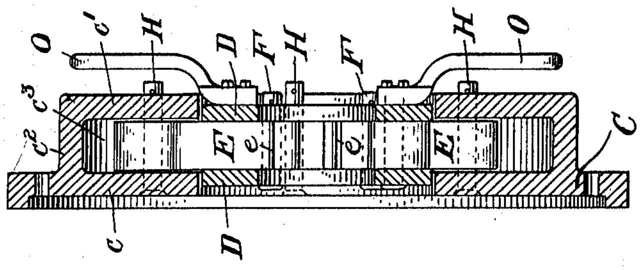
Figure 2:
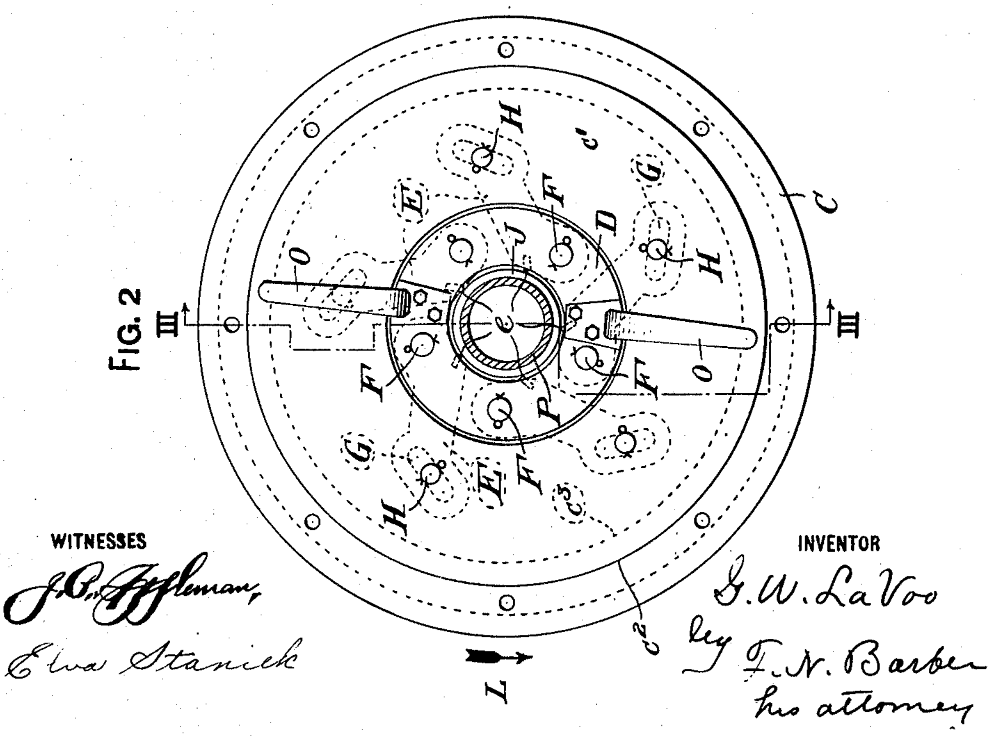

Referring to the accompanying drawings, Figure 1 is a side elevation partly broken away of a socket-screwing machine embodying my invention; Fig. 2, an end elevation of the holder or chuck for the socket with a socket in section; Fig. 3, a section of Fig. 2 on the line 3—3, the socket being omitted; Fig. 4, a face and edge view of one of the rings for controlling the gripping levers; and Fig. 5, a face and edge view of one of the gripping levers.

On the drawings, A is a horizontal cylinder or spindle rotatable axially by applying power to the spur-gear B carried by the cylinder A. The forward end of the cylinder has secured thereto by the screws *a* the chuck or holder C which contains the principal novel features of my invention.

The chuck C has a frame composed of the vertical back and front walls *c* and *c'* connected together by the lateral wall $c^2$ or otherwise so as to leave the space $c^3$. The back wall *c* is provided with the bolt holes $c^4$ for the said bolts *a*, by which the chuck C is removably secured to the cylinder A.

The walls *c* and *c'* have central or axial openings in which the rings D lie parallel with the said walls. Within the space $c^3$ and between the rings D I place five socket-gripping levers E, having their inner ends pivotally connected to the rings D by the pins F and their outer ends provided with the slots G, in which the pins H in the walls *c* and *c'* are seated. The levers E are provided with the teeth *e*, arranged to project into the central opening of the chuck and bite into the surface of the coupling J or other article and prevent its rotation relative to the chuck. I have shown the tooth *e* on each lever between its fulcrum F and the point (pin H) of application of power. The chuck rotates with the arrow L shown on Fig. 2. I have shown the slots G to include the tangents of a circle somewhat larger than the rings D, but the angle which the slots bear to the radius of the rings may vary considerably. These tangents pass through the slots G in front of the points of tangency, so that any rotative movement of the rings D backwardly relative to the rotation of the chuck, or any checking of the rotation of the rings in their movement with the chuck, as would occur when the rotating socket engages the end of a pipe in the act of screwing the socket on the pipe, would cause the levers E to move slightly to the rear, that is, opposite the direction of the arrow L. This movement of the levers E would cause the teeth *e* to move toward the center of the chuck and bite the coupling J harder. It is readily seen that the action of the coupling on the levers is not such as to cause the levers to slide out on the pins H but always to slide inwardly. The slots G may be variously shaped and inclined and the levers may be variously shaped and the teeth *e* differently located without departing from the spirit of my invention.

M represents the presence of a chuck or holder of any kind for the pipe P, having movement toward and from the chuck C by means of the usual rack and pinion connection N. The outer ring D is provided with the handles O by which the rings may be rotated.

The operation is as follows: The pipe P is clamped in the chuck M and the coupling J is partly screwed on the pipe P by hand. The chuck M is advanced by the rack and pinion mechanism N so that the coupling J is placed in the space surrounded by the levers or jaws E. The chuck C is then set in rotation in the direction indicated by the arrow L on Fig. 2 and the levers are actuated by the hands of the operator to move the rings D in the direction opposite to that of the arrow L or the levers are held to prevent the travel of the rings D until the teeth *e* engage the coupling. As soon as the teeth *e* bite the coupling, the resistance offered by the coupling tends to rotate the rings still further in the back direction causing the teeth to engage the coupling with greater force, the force being greater as the resistance increases. After the coupling is screwed on tight, the coupling is released from the chuck by moving the rings in the direction of the arrow, or if that be impossible, by reversing the rotation of the chuck.

It is clear that my improved chuck could be used as a stationary holder and to hold solid as well as tubular articles, and articles having various cross-sectional shapes.

I claim—

1. In a chuck, a frame, a ring rotatably connected thereto, gripping levers pivotally connected to the ring, and means providing a slidable connection between the frame and the levers, whereby the relative movement of the ring and the frame in one direction causes the gripping part of the levers to move longitudinally and toward the center of the rings.

2. In a chuck, a frame, a ring rotatably connected thereto, gripping levers pivotally connected to the ring, and means for causing the levers to have a longitudinal and pivotal movement at their outer ends when the ring and the frame have relative rotary movement.

3. In a chuck, a frame, a ring rotatably connected thereto, gripping levers pivotally connected to the ring, and a pin and slot connection between the frame and each lever.

4. In a chuck, a frame, a ring rotatably connected thereto, gripping levers pivotally connected at one end to the ring, a pivotal and slidable connection between the frame and each lever, and teeth carried by the levers between their pivotal points.

5. In a chuck, a frame, a ring rotatably connected thereto, gripping levers pivotally connected to the ring, means for causing the levers to have a longitudinal and pivotal movement at their outer ends when the ring and the frame have relative rotary movement, and means for rotating the ring.

6. In a chuck, a frame having connected back and front walls, gripping levers between the said walls, a rotatable ring carried by the frame at each side of the levers, a pivotal connection between the rings and each lever, a pivotal and slidable connection between each lever and the frame, and gripping means on the inner ends of the levers.

Signed at Steubenville, Ohio, this 9th day of April, A. D. 1910.

GEORGE W. LA VOO.

Witnesses:
W. B. Higgins,
H. E. Schaefer.